United States Patent
Hayashi

(10) Patent No.: US 6,328,274 B1
(45) Date of Patent: Dec. 11, 2001

(54) MOTOR SUPPORTING STRUCTURE

(75) Inventor: Eiichi Hayashi, Ohmiya (JP)

(73) Assignee: Fuji Photo Optical Co., Ltd., Saitama-Ken (JP)

( * ) Notice: Subject to any disclaimer, the term of this patent is extended or adjusted under 35 U.S.C. 154(b) by 0 days.

(21) Appl. No.: 09/277,633

(22) Filed: Mar. 26, 1999

(30) Foreign Application Priority Data

Mar. 31, 1998 (JP) .................................................. 10-103456

(51) Int. Cl.$^7$ .............................. F16M 1/00; H02K 5/24
(52) U.S. Cl. .......................... 248/638; 248/606; 248/635; 310/51
(58) Field of Search ..................................... 248/638, 550, 248/672, 560, 570, 609, 636, 606, 635; 310/51

(56) References Cited

U.S. PATENT DOCUMENTS

| | | | |
|---|---|---|---|
| 1,778,992 | * 10/1930 | Wulfert | 248/635 |
| 2,508,641 | * 5/1950 | Heintz | 248/606 |
| 2,575,858 | * 11/1951 | Bennett | 248/606 |
| 3,154,704 | * 10/1964 | Shaffer | 310/51 |
| 3,330,515 | * 7/1967 | Janssen et al. | 248/606 |
| 4,520,987 | * 6/1985 | Eguchi et al. | 248/635 |
| 4,643,386 | * 2/1987 | Chastine | 248/632 |
| 4,648,579 | * 3/1987 | Wilson | 248/638 |
| 4,655,099 | * 4/1987 | Hansen | 74/421 A |
| 4,679,761 | * 7/1987 | Small | 248/609 |
| 5,044,598 | * 9/1991 | Mann et al. | 248/638 |
| 5,366,198 | * 11/1994 | Dickinson | 248/550 |

* cited by examiner

Primary Examiner—Anita King
(74) Attorney, Agent, or Firm—Price, Heneveld, Cooper, DeWitt & Litton

(57) ABSTRACT

A motor supporting structure having a vibration damping function without requiring a separate vibration damping member. To achieve this, an elastic member is disposed between a bracket and a supporting plate and bonding them in a single part, so that the number of parts can be reduced and the operation of mounting the motor can be simplified. Then, the bracket may be mounted at a predetermined position and the motor may be mounted on the supporting plate to install the motor at a predetermined position. Specifically, an elastic member is disposed between a bracket fixed to a frame and a supporting plate is fixed to a motor and these members are integrally bonded together. The supporting plate may be fixed to the motor by bolts and the bracket may be fixed to the frame by bolts to mount the motor on the frame. The supporting plate may be replaced by a casing of the motor.

16 Claims, 7 Drawing Sheets

MOTOR SUPPORTING STRUCTURE

BACKGROUND OF THE INVENTION

This invention relates to a motor supporting structure used to support the motor on a frame and having an elastic member adapted for preventing a vibration of the motor from being transmitted to the fame disposed between the frame and the motor.

An image reading apparatus, such as an image scanner, usually utilize the drive force of a motor to drive a member adapted to scan an original and read video information from the original. The motor is mounted within the image reading apparatus, and there is always an apprehension that a vibration might be transmitted from the motor to the other various components. To avoid this, a motor supporting structure adapted for elastically supporting the motor on the frame has been conventionally used. In the prior art as shown in FIGS. 7 and 8, the motor 4 is supported by a motor supporting structure 1 comprising a substantially L-shaped bracket 3 fixed to a frame 2 and a vibration damping member 5 disposed between motor 4 and bracket 3.

Vibration damping member 5 is provided in the form of an elastic member 7 made, for example, of rubber material disposed between a pair of supporting plates 6 and integrated therewith by suitable means, such as curing adhesion. Vibration damping member 5, bracket 3, and motor 4 are fixed by means of screw-clamping utilizing bolts 8.

With this motor supporting structure 1, a vibration transmitted from motor 4 to bracket 3 is damped by the vibration damping member 5, and a vibration of the other components of the apparatus can be avoided.

However, motor supporting structure 1 of the prior art as described above is disadvantageous in that the cost of parts inevitably increases, since vibration damping member 5 comprising elastic member 7 and the paired supporting plates 6 is disposed between bracket 3 and motor 4, and the number of parts correspondingly increases.

Additionally, vibration damping member 5 must be provided separately of motor 4 and bracket 3. Consequently, mourning motor 4 becomes complicated and troublesome. Thus, a high working efficiency cannot be expected, and time taken for this operation becomes undesirably long.

SUMMARY OF THE INVENTION

In view of the problem as described above, it is a principal object of the invention to provide a motor supporting structure allowing the number of parts to be reduced and allowing mounting of the motor to be simplified.

The object set forth above is achieved, according to the invention, by a motor supporting structure for elastically supporting a motor on a frame. The motor supporting structure comprises a bracket fixed to the frame and an elastic member bonded to the bracket and fixed to the motor.

During actuation of the motor, a vibration transmitted from the motor to the bracket can be damped by the elastic member. This elastic member is bonded directly to the bracket, and it is unnecessary to dispose a separate part serving as the vibration damping member between the bracket and the motor as has been demanded in the conventional structure. In addition, the bracket and the elastic member are previously bonded together into a single part, and therefore the step of assembling the vibration damping member with the bracket during operation of mounting the motor can be eliminated. As a consequence, the working efficiency of mounting the motor may be improved.

Preferably, a supporting plate bonded to the elastic member and fixed to the motor is disposed between the elastic member and the motor.

In this manner, the bracket, the elastic member, and the supporting plate can be conveniently handled as a single part by previously integrating these members, and the motor can be mounted on the bracket merely by fixing the motor to the supporting plate.

Preferably, the elastic member and the motor are bonded together.

The bracket, the elastic member, and the motor's casing can be handled as a single part by bonding these members together. Thus, the step of mounting the motor on the bracket can thereby be eliminated.

Preferably, surface zones of the elastic member and the motor to be bonded together are formed with recesses and projections, resectively, adapted to be tightly engaged with each other. Such arrangement allows the elastic member and the motor to be bonded together over a large area and thereby ensures a firm integration of these members. Even when an external force is exerted on this assembly and tends to shear this assembly along its bonded interface, the recesses and projections are pressed against each other substantially in vertical direction to hold this assembly and effectively increase a resistance against the peeling off of the elastic member from the motor.

Preferably, surface zones of the bracket and the elastic member to be bonded together are formed with projections and recesses, respectively, adapted to be tightly engaged with each other. Such arrangement contributes to enlarge an area over which the bracket and the elastic member are bonded together and to ensure a firm integration of these two members. Even when an external force is exerted on this assembly and tends to shear this assembly along its bonded interface, the recesses and projections are pressed against each other substantially in vertical direction to hold this assembly and effectively increase a resistance against the peeling off of the elastic member from the bracket.

Preferably, the recesses and projections are distributed substantially at regular intervals on a common circumference defined around an output shaft of the motor. Even when a circumferential stress is generated around the output shaft between the bracket and the motor due to actuation of the motor, such stress is absorbed by the recesses and projections in a uniform and well-balanced manner.

Preferably, the motor supporting structure further includes a flange extending from a peripheral edge surrounding a through-hole of the bracket for insertion of the motor's output shaft in a direction away from the elastic member and a projection extending from the elastic member towards an inner side of the flange so as to be bonded to an inner peripheral surface of the flange. Such arrangement is effective to enlarge an area over which the elastic member and the bracket are bonded together and thereby to ensure a ether firm integration of these two members. Additionally, even when an external force is exerted on this assembly and tends to shear this assembly along its bonded interface, the projection of the elastic member is pressed against the inner peripheral surface of the flange substantially in vertical direction to hold this assembly and thereby increases a resistance against the peeling off of the elastic member from the bracket.

Preferably, the elastic member is made of rubber material. Preferably, the frame is a frame used in an image reading apparatus. Accordingly, the motor can be mounted on such image reading apparatus with fewer parts and a high working efficiency. Vibration transmitted from the motor to the frame can be reliably prevented so that the image reading apparatus can reliably operate and provide a desired function.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
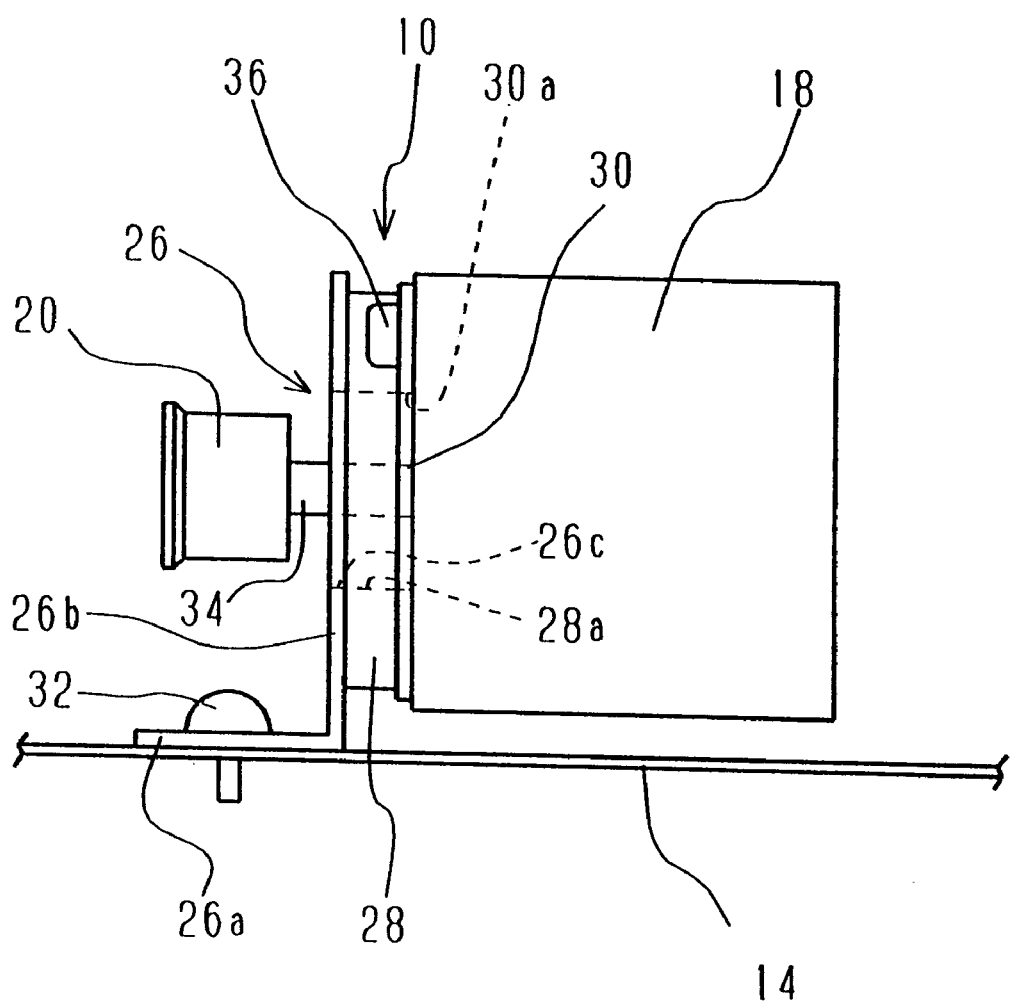
FIG. 1 is a side showing view an embodiment of the motor supporting structure according to the invention.
Figure 2:
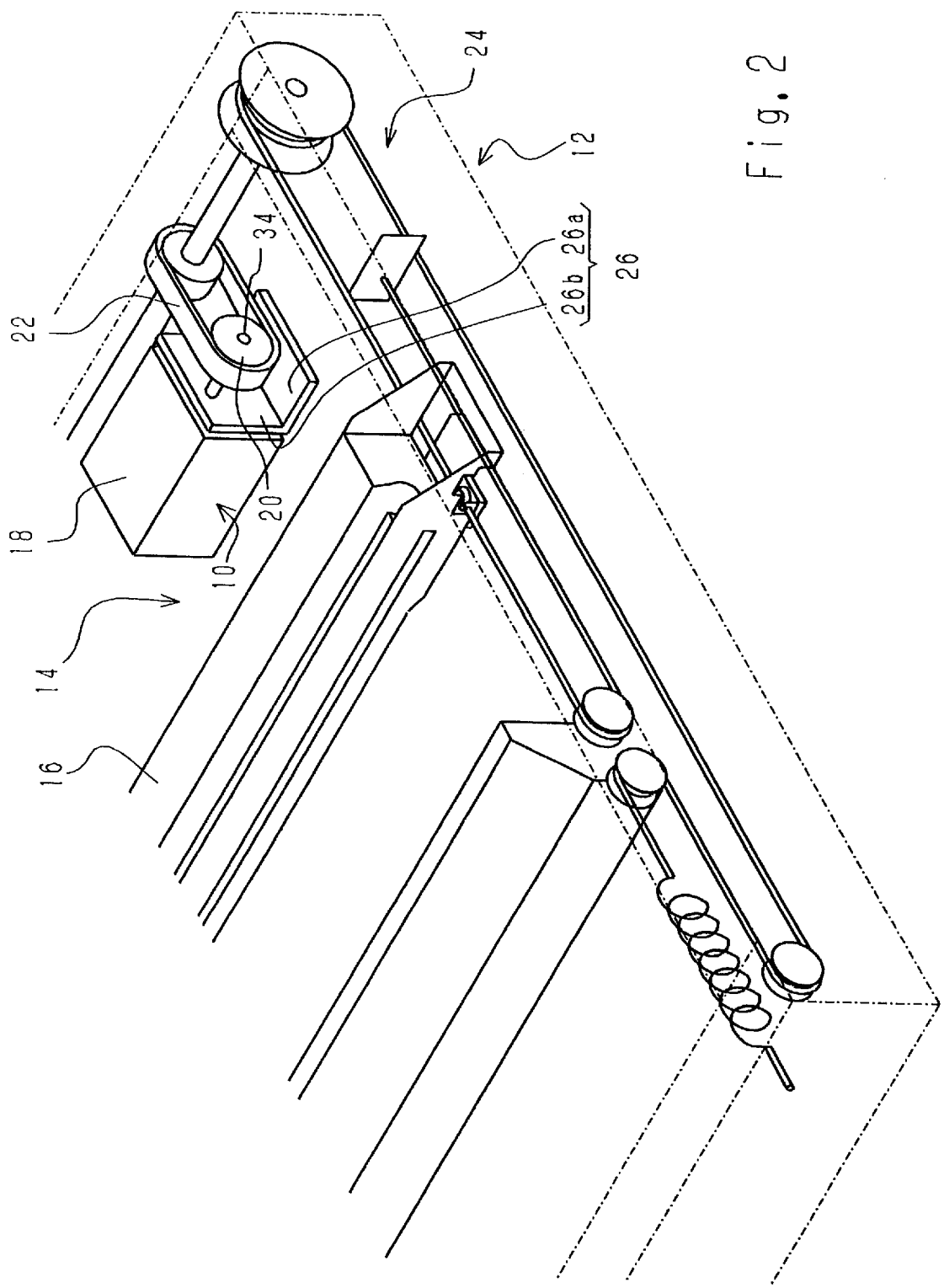
FIG. 2 is a perspective view of the motor supporting structure according to the invention as mounted on an image processor in the form of an image scanner.

Details of the motor supporting structure according to the invention will be more fully understood from the following description of the preferred embodiments shown by the accompanying drawings. It should be understood that these embodiments of a motor supporting structure 10 will be herein described with respect to a specific case in which said structure 10 is adapted for elastically supporting a motor 18, which serves as a drive source for movable components such as a carrier 16 on a frame 14 of an image scanner 12, as will be apparent from FIGS. 1 through 3. In FIG. 2, reference numeral 20 designates a pulley directly in operative association with the motor 18, reference numeral 22 designates a belt driven by pulley 20, and reference numeral 24 designates a transmission mechanism serving to transmit a drive force from motor 18 to the movable components, such as carrier 16. Obviously, such motor supporting structure 10 can be used not only in combination with the image scanner 12, but also in combination with other apparatuses in which the motor 18 must be elastically supported.

The motor supporting structure 10 comprises a bracket 26 fixed to frame 14, a supporting plate 30 fixed to motor 18, and an elastic member 28 disposed between bracket 26 and supporting plate 30. Bracket 26 is made of metal, and presents a substantial L-shape defined by a section 26a fixed to the frame and a motor supporting section 26b. Sections 26a and 26b are perpendicular to each other. Section 26a is fixed to frame 14 by a clamping means, such as a bolt 32. Motor supporting section 26b is provided in the form of a flat board formed with a through-hole 26c through which an output shaft 34 of motor 18 extends. Elastic member 28 has its one surface bonded to the surface of motor supporting section 26b which faces motor 18.

Elastic member 28 is made of rubber and is substantially disk-shaped. While elastic member 28 is made of rubber according to this embodiment, it is also possible to use material of another type, such as plastic or vinyl, so long as a desired elasticity is obtained. Elastic member 28 has a through-hole 28a in a central zone thereof through which an output shaft 34 of motor 18 extends. Motor supporting section 26b is bonded to elastic member 28 along an annular interface. Bonding together of bracket 26 and elastic member 28 is performed by means of curing adhesion. It should be understood that the bonding technique is not limited to this curing adhesion and it is also possible to use other conventional or even any novel means.

Figure 3:
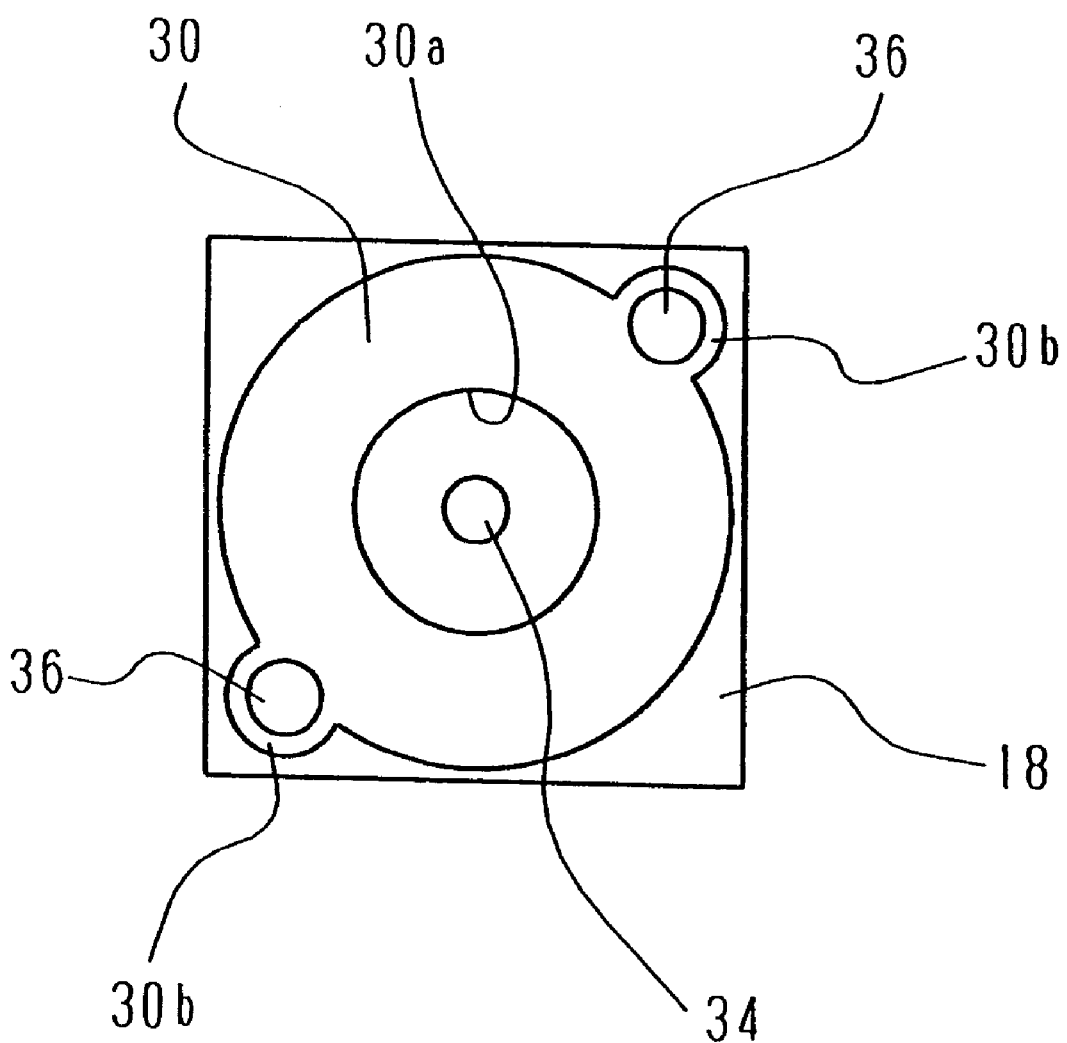
FIG. 3 is a front view schematically showing a manner in which a supporting plate is assembled with rotor supported by the supporting structure according to the invention.

Supporting plate 30 is bonded to the other surface of elastic member 28, i.e., the surface which faces motor 18, by suitable means, such as said curing adhesion. Supporting plate 30 presents a substantially disk-like shape having an outer diameter slightly larger than that of elastic member 28. As seen in FIG. 3, supporting plate 30 has a through-hole 30a in its central zone through which output shaft 34 of motor 18 extends, and has an outer peripheral edge partially extending outwards so as to form a plurality of screw washer-lie sections 30b. Supporting plate 30 and elastic member 28 are bonded together over annular surface zones thereof. It should be understood that the bonding technique is not limited to curing adhesion and it is used with other conventional or novel means. Screw washer-like sections 30b of supporting plate 30 are clamped by bolts 36 to a frontsurface of a motor casing.

Motor 18 is elastically supported on fame 14 using the above-mentioned motor supporting structure 10 by going through several sequential steps as follows: motor supporting section 26b of bracket 26, elastic member 28, and supporting plate 30 are previously bonded together by means of curing adhesion to form a single part. Then, section 26a of bracket 26 is screw-clamped to frame 14. After output shaft 34 of motor 18 is inserted into the respective througholes 26c, 28a, and 30a of motor supporting section 26b, elastic member 28, and supporting plate 30, motor 18 is screw-clamped to said supporting plate 30. In this manner, motor 18 can be elastically supported on fame 14.

During operation of motor 18, vibration transmitted from motor 18 to bracket 26 can be damped by elastic member 28, and a precision of image scanner 12 can be thereby improved.

In the case of motor supporting structure 10 according to this embodiment, bracket 26, elastic member 28, and supporting plate 30 are previously integrated together so as to be handled as a single part. Therefore, it is unnecessary to separately fix vibration-damping member 28 and bracket 26 during operation of mounting the motor 18. In this way, the mounting of motor 18 can be simplified, and a time taken for mounting of the motor 18 can be reduced.

While the invention has been described in the connection with an example of the preferred embodiments, the invention is not limited to this specific embodiment, and many variations as well as modifications are possible without departing from the spirit and scope of the invention. For example, the invention is not limited to the specific arrangement adopted by this embodiment, such that motor supporting section 26b in the form of a flat plate and elastic member 28 in the form of a disk are bonded together over annular surface zones thereof. Such arrangement can be replaced, as shown in FIG. 4, by an arrangement, such that motor supporting section 26b is formed with a flange 26b and a projecting peripheral edge 28b is bonded to the inner surface of flange 26d followed by the so-called step of burring, so that motor supporting section 26b is bonded to elastic member 28 not only over an annular surface zone, but also over an inner peripheral surface 26e of flange 26d extending perpendicularly to said annular surface zone.

Figure 4:
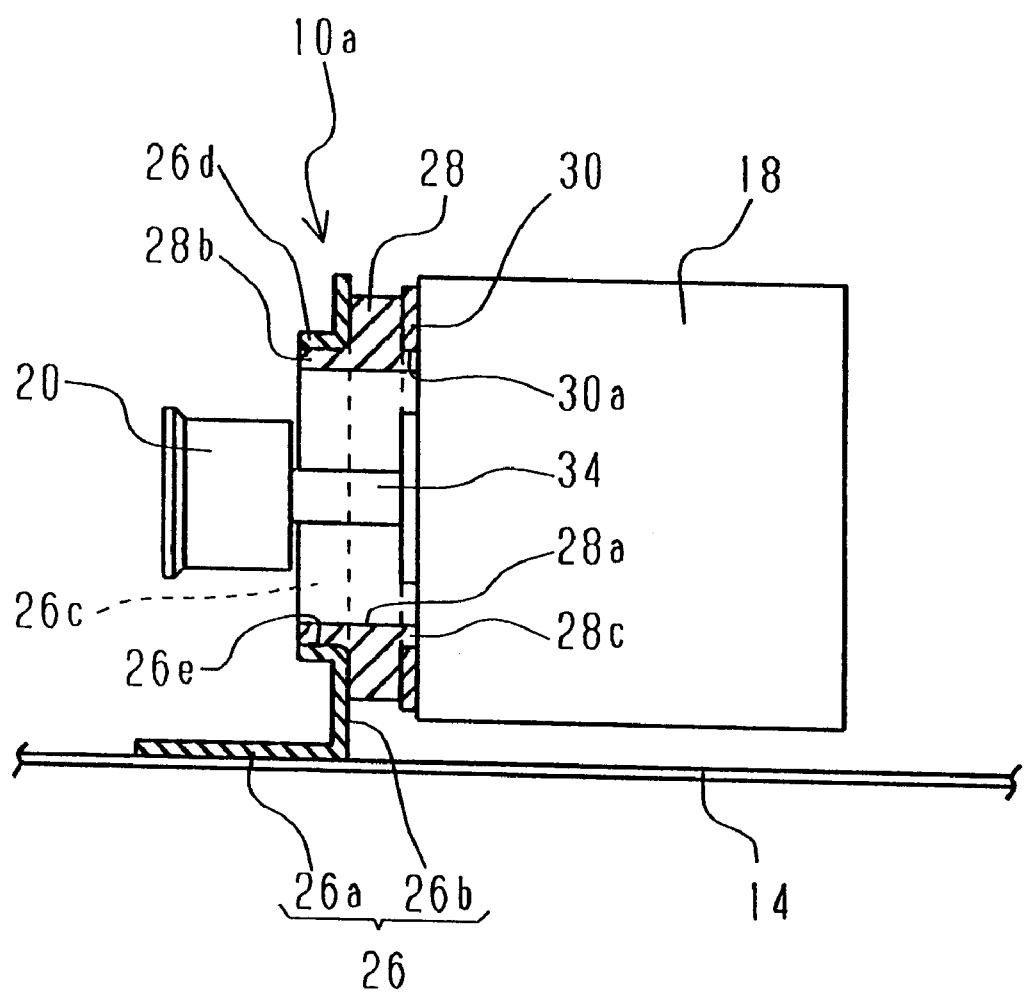
FIG. 4 is a view showing another embodiment of the motor supporting structure according to the invention.

In the alternative embodiment shown in FIG. 4, flange 26d is formed so as to extend forwardly with respect to elastic member 28 from the peripheral edge surrounding through-hole 26c of motor supporting section 26b. In the case of motor supporting structure 10a according to the embodiment shown in FIG. 4, elastic member 28 is bonded to bracket 26 over a relatively large area, and these members 28 and 26 can be more reliably integrated with each other than in the case of the previously described embodiment. In addition, a resistance against the peeling off of elastic member 28 from bracket 26 can be drastically improved, since the projecting peripheral edge 28b of elastic member 28 is pressed against inner peripheral surface 26e substantially in direct direction, so as to support an external force even when such external force is exerted on this assembly and tends to shear this assembly into elastic member 28 and bracket 26 along their mutually bonded interface. This embodiment also allows the number of parts conventionally required for the motor supporting structure to be reduced. Thus, the cost of parts, as well as the steps required for mounting motor 18, can be correspondingly reduced and simplified.

As will be apparent from FIG. 4, an arrangement is also possible in which a peripheral edge surrounding through-hole 28a of elastic member 28 extends towards motor 18 to form a peripheral projection 28c adapted to be tightly engaged with an inner peripheral surface of through-hole 30a extending through supporting plate 30. In this way, a resistance against the peeling off of elastic member 28 from supporting plate 30 can be improved, since peripheral projection 28c of elastic member 28 is pressed against the inner peripheral surface of through-hole 30a of supporting plate 30 substantially in vertical direction, so as to support an external shearing force even when such external force is exerted on this assembly and tends to shear this assembly into elastic member 28 and supporting plate 30 along their bonded interface.

While supporting plate 30 is disposed between elastic member 28 and motor 18 according to the previously described embodiments, it is also possible to bond elastic member 28 to motor 18 so that the number of parts can be further reduced.

Figure 5:
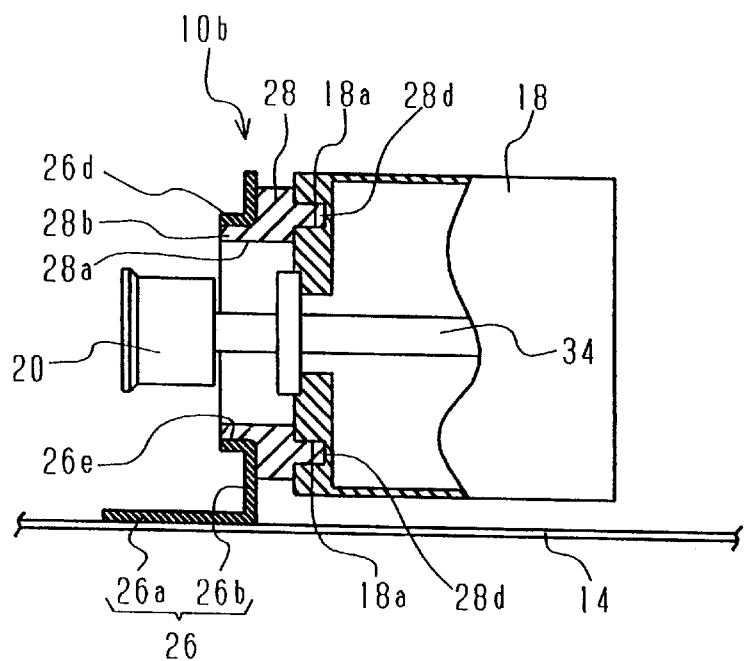
FIG. 5 is a side view showing still another embodiment of the motor supporting structure according to the invention.
Figure 6:
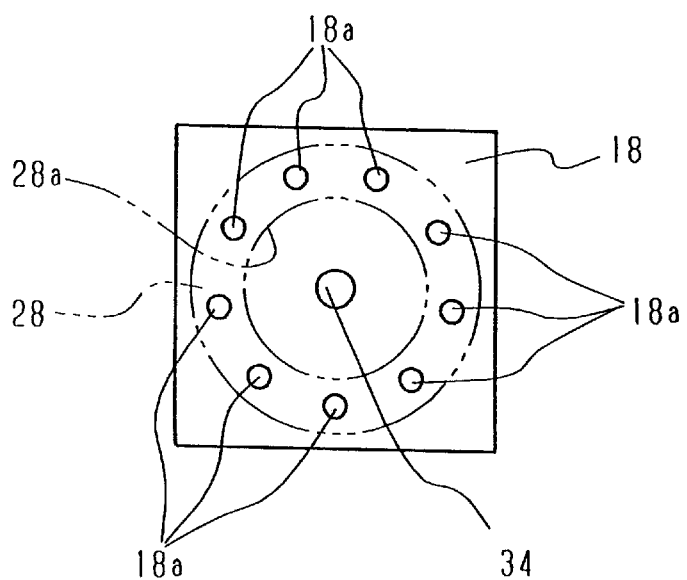
FIG. 6 is a front view showing the motor mounted with the supporting structure shown by FIG. 5.
Figure 7:
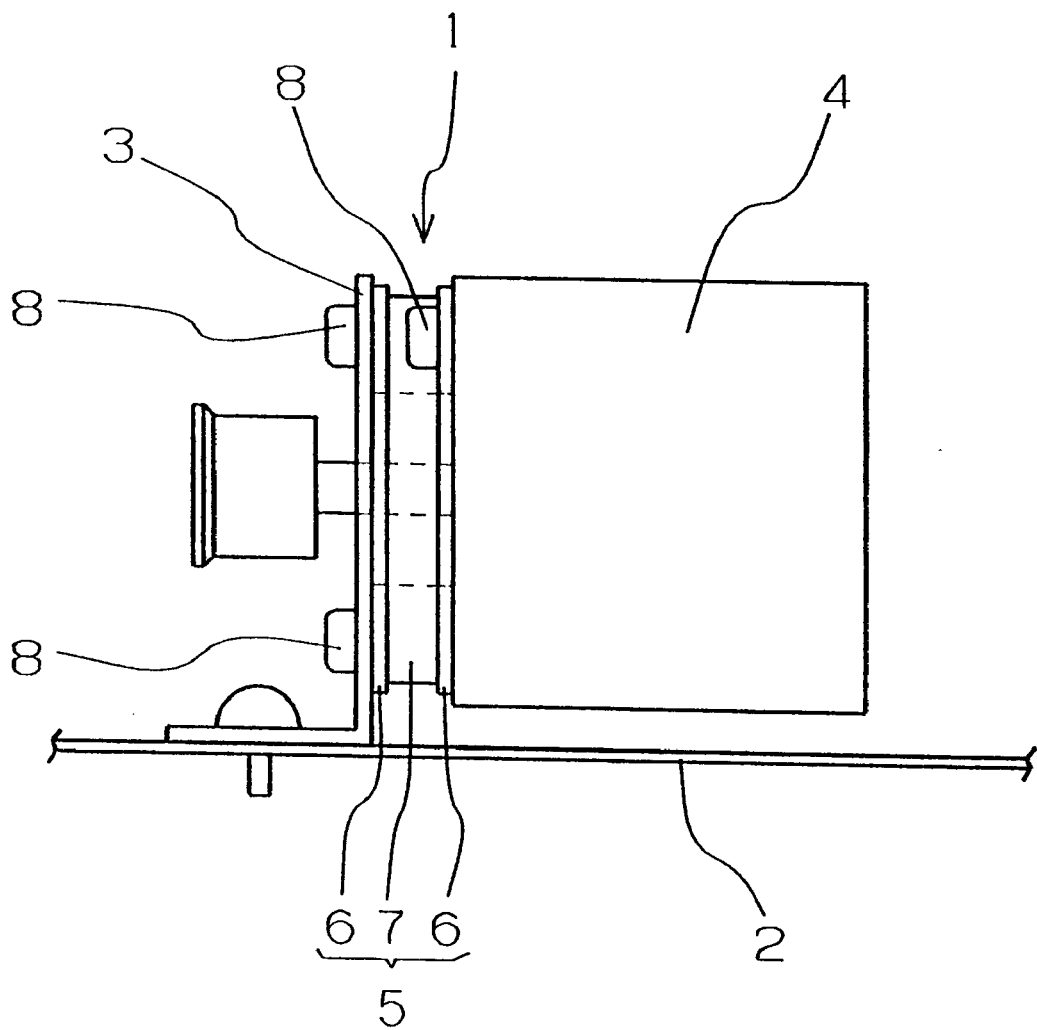
FIG. 7 is a side view showing a motor supporting suture of the prior art.
Figure 8:
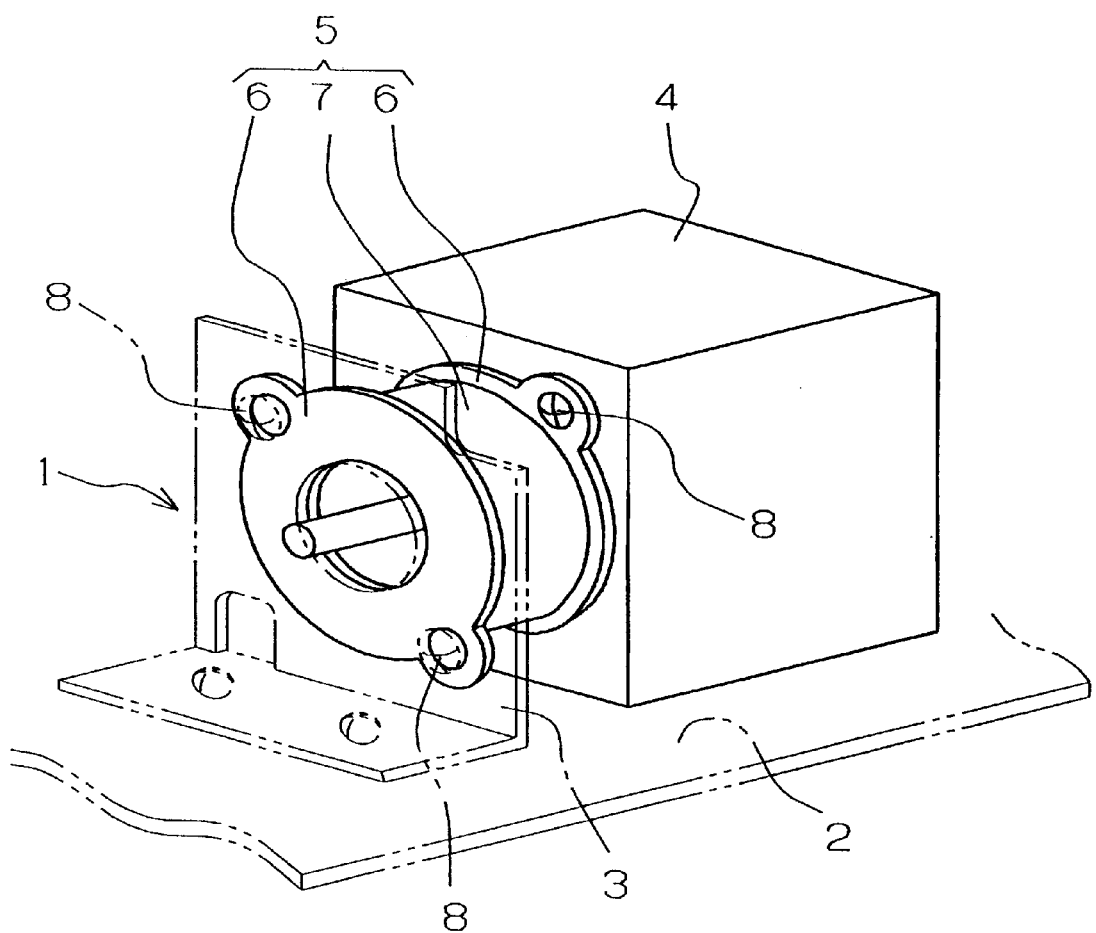
FIG. 8 is a perspective view showing the motor supporting structure of the prior art.

If it is desired to adopt the arrangement such that elastic member 28 is bonded to motor 18, the surface of elastic member 28 to be bonded to motor 18, as well as the surface of motor 18 to be bonded to elastic member 28, are preferably formed with recesses 18a and projections 28d, respectively, which are adapted to be tightly engaged with each other. An example of motor supporting structure 10b having such an arrangement is shown in FIG. 5. According to this embodiment, the surface of elastic member 28 which faces motor 18 is formed with projections 28d, while the surface of the motor casing which faces elastic member 28 is formed with recesses 18a. These projections 28d and recesses 18a may be tightly engaged with each other and bonded together with suitable means such as curing adhesion to enlarge an area over which elastic member 28 is bonded to the motor casing and to thereby ensure a reliable integration of these two members. As more specifically shown in FIG. 6, recesses 18a for engaging projections 28d are distributed substantially at regular intervals on a common circumference defined around output shaft 34 of motor 18, respectively. With such an agreement, even when actuation of motor 18 generates a circumferential stress around output shaft 34 between bracket 26 and motor 18, such stress can be absorbed by the respective projections 28d and recesses 18a in a uniform and well-balanced manner. It will be understood that the distribution of these recesses 18a for engaging projections 28d is not limited to the arrangement shown in FIG. 6. The embodiment shown in FIGS. 5 and 6 allows the number of parts to be further reduced with an advantageous result that not only the cost of parts can be reduced, but also the steps required for mounting the motor 18 can be simplified.

While elastic member 28 is formed with projections 28d and motor 18 is formed with recesses 18a according to the embodiment shown in FIG. 5, it is also possible to form the elastic member 28 with the recesses and to form motor 18 with projections. In this case also, the area over which elastic member 28 is bonded to motor 18 can be maintained sufficiently large to ensure a firm integration of these two members.

Instead of formimg elastic member 28 with projections 28d and forming motor 18 with recesses 18a as in the embodiment shown in FIG. 5, it is also possible to form elastic member 28 and motor supporting section 26b with these projections and recesses, respectively. In this case, elastic member 28 and motor supporting section 26b can be bonded together over a sufficiently large area to ensure a firm integration of these two members.

As will be apparent from the foregoing description, the motor supporting structure according to the invention adopts a unique arrangement, such that the elastic member functioning as a vibration-damper is bonded to the bracket and thereby eliminates a demand for providing a separate vibration damping member as in the structure of prior art. Thus, not only can the number and cost of parts be reduced, but also a compact and lightweight motor supporting structure can be realized. Additionally, the bracket and the elastic member can be handled as a single part by previously integrating these two members. Thus, it is unneessary to assemble the vibration damping member with the bracket during the step of mounting the motor. In this manner, the operation of mounting the motor can be simplified, and the time taken for such operation can be correspondingly reduced.

It is also possible to handle the bracket, elastic member, and supporting plate, which have previously been integrated together, as a single part. In this way, the motor can be mounted on the bracket merely by fixing the motor to the supporting plate and thereby a working efficiency for mounting the motor can be improved.

The elastic member may be previously bonded to the motor casing to eliminate a step of mounting the motor on the bracket, and thus a working efficiency for mounting the motor can also be improved.

The interface of the elastic member and the motor over which these two members are bonded together may be formed with the projections and the recesses adapted to be tightly engaged with each other in order to ensure a sufficiently large area used for bonding these two members to make their integration firm. From the other viewpoint, such arrangement effectively increases a resistance against the peeling off of the elastic member from the motor, since these projections and recesses are pressed against one another substantially in vertical direction so as to hold the assembly even when an external force is exerted on this assembly that tends to shear the elastic member from the motor along its bonded interface.

It is also possible to form the respective surface zones over which the bracket and the elastic member are bonded together with the projections and the recesses adapted to be tightly engaged with each other in order to ensure a large area for bonding these two members and thereby to make their integration firm. These projections and recesses are pressed against one another substantially in vertical direction so as to hold this assembly even when an external force is exerted on this assembly that tends to shear the elastic member from the bracket. Thereby a resistance against the peeling off of the elastic member from the bracket can be improved.

The projections and recesses are preferably distributed substantially at regular intervals on a common circumference defined around the output shaft of the motor. With this arrangement, the projections and recesses can absorb a circumferential stress possibly generated around the output shaft between the bracket and the motor due to actuation of the latter. Such circumferential stress can be absorbed by the projections and recesses in a uniform and well-balanced manner.

By forming the flange extending forwardly with respect to the elastic member from the peripheral edge surrounding the through-hole of the bracket, and forming the projection extending from the elastic member so as to be bonded to the inner peripheral surface of the flange, the area over which the elastic member and the bracket are bonded together can be enlarged, and further firm integration of these two members can be achieved. Even when an external force is exerted on this assembly and tends to shear this along its bonded interface, the projection of the elastic member is pressed against the inner peripheral surface substantially in vertical direction to hold this assembly against the external force and to thereby increase a resistance against the peeling off of the elastic member from the bracket.

The elastic member may be made of rubber material to avoid a propagation of vibration reliably while providing an inexpensive elastic member.

In view of the fact that the frame is the frame used in an image reading apparatus, vibration of the motor can be effectively prevented from being transmitted to the frame of the image reading apparatus, and a reliable operation as well as a desired function of the image reading apparatus can be assured.

The above description is considered that of the preferred embodiments only. Modifications of the invention will occur to those skilled in the art and to those who make or use the invention. Therefore, it is understood that the embodiments shown in the drawings and described above are merely for illusive purposes and not intended to limit the scope of the invention, which is defined by the following claims as interpreted according to the principles of patent law, including the doctrine of equivalents.

The invention claimed is:

1. A motor supporting structure for elastically supporting a motor on a frame, said motor supporting structure comprising:
   a bracket adapted to be fixed to said frame; and
   an elastic member bonded to said bracket and adapted to be fixed to said motor;
   wherein said elastic member is adapted to be bonded to said motor; and
   wherein surface zones of said elastic member adapted for bonding to said motor are formed with at least one of recesses and projections that are adapted to be tightly engaged with respective projections or recesses of said motor.

2. The motor supporting structure according to claim 1, wherein said recesses and projections are distributed substantially at regular intervals on a common circumference defined around an output shaft of said motor.

3. The motor supporting structure according to claim 1, further including a flange extending from a peripheral edge surrounding a through-hole of said bracket for insertion of the motor's output shaft in a direction away from said elastic member and a projection extending from said elastic member towards an inner side of said flange so as to be bonded to an inner peripheral surface of said flange.

4. The motor supporting structure according to claim 1, wherein said elastic member is made of rubber material.

5. The motor supporting structure according to claim 1, wherein said frame is used in an image reading apparatus.

6. The motor supporting structure according to claim 1, wherein surface zones of said elastic member are formed with projections.

7. A motor supporting structure comprising:
   a motor;
   a bracket adapted to be fixed to a frame; and
   an elastic member bonded to said bracket and fixed to said motor;
   wherein said elastic member is bonded to said motor for elastically supporting said motor on the frame; and
   wherein surface zones of said elastic member bonded to said motor are formed with at least one of recesses and projections that are tightly engaged with at least one of projections and recesses of said motor.

8. The motor supporting structure according to claim 7, wherein said recesses and projections are distributed substantially at regular intervals on a common circumference defined around an output shaft of said motor.

9. The motor supporting structure according to claim 7, wherein said elastic member is made of rubber material.

10. The motor supporting structure according to claim 7, wherein said frame is used in an image reading apparatus.

11. The motor supporting structure according to claim 7, further including a flange extending from a peripheral edge surrounding a through-hole of said bracket for insertion of the motor's output shaft in a direction away from said elastic member and a projection extending from said elastic member towards an inner side of said flange so as to be bonded to an inner peripheral surface of said flange.

12. The motor supporting structure according to claim 7, wherein surface zones of said elastic member are formed with projections and surface zones of said motor are formed with recesses.

13. A motor supporting structure for elastically supporting a motor on a frame, said motor supporting structure comprising:
    a bracket adapted to be fixed to said frame; and
    an elastic member bonded to said bracket and adapted to be fixed to said motor;
    wherein a supporting plate bonded to said elastic member and adapted to be fixed to said motor is configured for disposition between said elastic member and said motor; and
    wherein said elastic member includes an annular projection extending into a hole in said supporting plate.

14. The motor supporting structure according to claim 13, further including a flange extending from a peripheral edge surrounding a through-hole of said bracket for insertion of the motor's output shaft in a direction away from said elastic member and a projection extending from said elastic member towards an inner side of said flange so as to be bonded to an inner peripheral surface of said flange.

15. A motor supporting structure comprising:

a motor;

a bracket adapted to be fixed to a frame; and an elastic member bonded to said bracket and fixed to said motor;

wherein said elastic member is bonded to said motor for elastically supporting said motor on the frame;

wherein a supporting plate bonded to said elastic member and adapted to be fixed to said motor is configured for disposition between said elastic member and said motor; and wherein said elastic member includes an annular projection extending into a hole in said supporting plate.

16. The motor supporting structure according to claim 15, further including a flange extending from a peripheral edge surrounding a through-hole of said bracket for insertion of the motor's output shaft in a direction away from said elastic member and a projection extending from said elastic member towards an inner side of said flange so as to be bonded to an inner peripheral surface of said flange.

* * * * *